United States Patent [19]
Hudson

[11] 3,715,787
[45] Feb. 13, 1973

[54] KINETIC ENERGY DEVICE FOR FORMING WORK PIECES

[76] Inventor: Arthur Franklin Hudson, P.O. Box 1025, Huntington, Ind. 46750

[22] Filed: Nov. 25, 1970

[21] Appl. No.: 92,669

[52] U.S. Cl..........................29/76 R, 29/78, 29/105, 51/206
[51] Int. Cl. ....B23d 67/00, B23d 69/00, B23d 71/00
[58] Field of Search..............29/76, 78, 95, 105, 103; 51/206

[56] References Cited

UNITED STATES PATENTS

| | | | |
|---|---|---|---|
| 3,557,418 | 1/1971 | Salukvadze | 29/105 |
| 3,503,108 | 3/1970 | Kidgell et al. | 29/95 |
| 3,513,821 | 5/1970 | Bouvier | 51/206 R |

*Primary Examiner*—Harrison L. Hinson
*Attorney*—John A. Young

[57] ABSTRACT

A kinetic energy device at substantial rates of speed develops an apparent hardness which is considerably in excess of its inherent hardness. A rotatable member having a plurality of protuberances and consisting of metal or other suitable composition, will develop properties at high rate of speed which is a function of the speed itself, thus the material comprising the protuberances takes on apparent hardness many times that of the same material in a static condition. The present invention utilizes this property of high speed in the order of 10,000 – 100,000 surface feet per minute rotational speed, to develop apparent hardness in the projectiles on the periphery of the machining wheel so that the designer has not only available to him a wide range of materials which were heretofore impractical to use in machining operation, but also has the ability to use a kinetic energy device in such applications as stock removal, wherein the working piece, i.e., the kinetic energy possessing piece can perform its intended function at lower wear rate, at lower temperatures, the product removed is in a more desirable size or form, and the work piece is formed without causing mechanical rupturing of the total work piece or other objectionable damage thereto.

7 Claims, 14 Drawing Figures

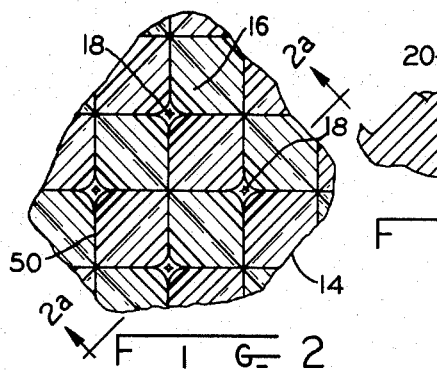
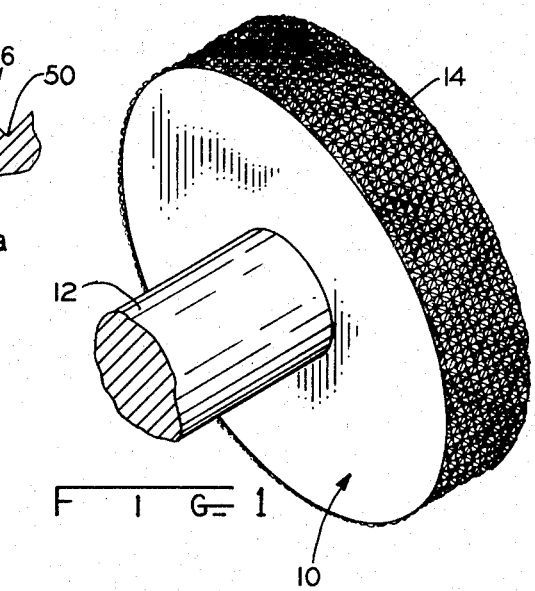
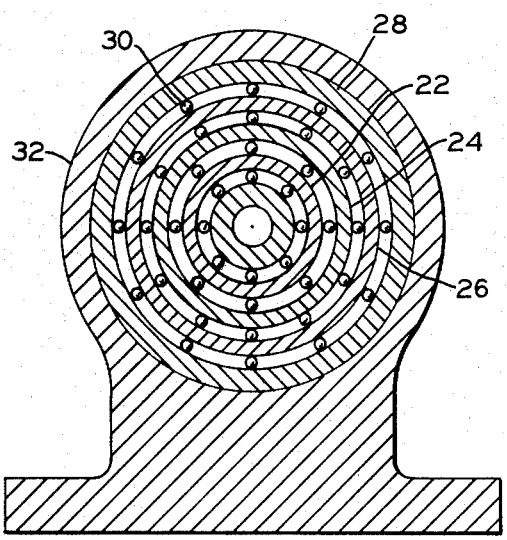
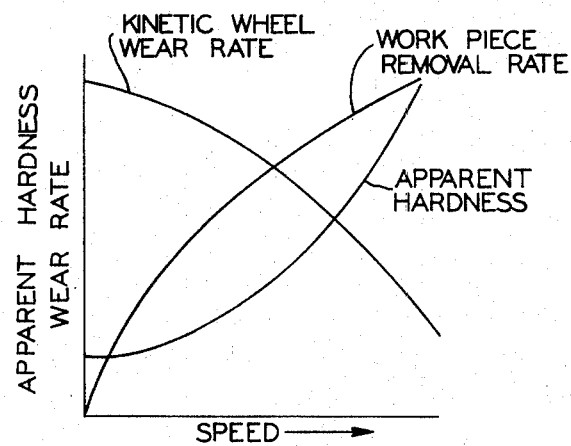
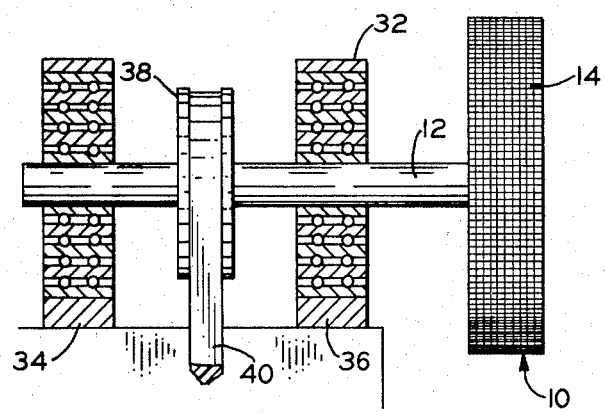
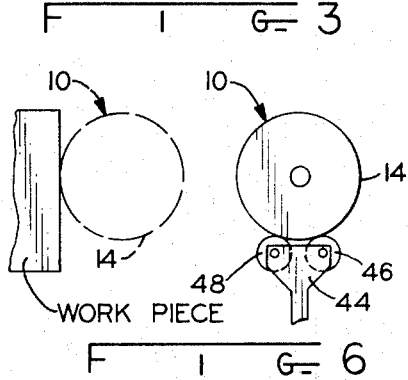

INVENTOR
ARTHUR F. HUDSON

BY John A. Young
ATTORNEY

KINETIC ENERGY DEVICE FOR FORMING WORK PIECES

BACKGROUND OF THE INVENTION

The art of forming materials by using grinding wheels and the like, and the selection of the grinding wheel, is made on the basis of the work piece hardness. For example, if the work piece is a strong hard metallic or alloy composition such as tungsten carbide, the grinding wheel must be of a harder composition relatively thereto, thus necessitating the use of expensive grinding wheel composition such as diamond or the like. In each instance, the principle applied is to use an inherent hardness grinding wheel of higher value than the work piece, and this is obviously a limitation upon the designer of the grinding wheel in the selection of available grinding wheel compositions. The problem is a particularly acute one where it is necessary to use expensive compositions which are difficult to fabricate into grinding wheels and are likewise expensive because of the cost of such material. It has never proved practical to utilize a relatively softer material as the grinding wheel or cutting component as compared with the work piece, the work piece being the piece worked on and the grinding wheel being the tool.

Because of the limitation of the prior art in the form of providing a relatively harder material for the grinding wheel, the prior art is necessarily limited in choice of materials, and consequently the cost of fabricating grinding wheels has proved to be an expensive and somewhat erratic operation.

In the present invention, a new concept is provided wherein the cutting wheel is moved at extraordinarily high speeds so that it exhibits a hardness quality which is different from the inherent hardness property and consequently the choice of material can be more varied and is not limited to a relatively harder material than the piece worked upon, owing to the kinetic energy of the working component. For example, a copper construction grinding wheel would be entirely unsuited for machining or grinding a relatively harder material where the copper composition wheel was rotated at a relatively slow speed. When the copper wheel is rotated at high speeds, it exhibits an apparent hardness which is substantially higher than the inherent hardness, such speeds being rotational speeds equivalent to the range of 10,000 – 100,000 surface speed in feet per minute.

A cutting wheel which is rotated at these speeds is provided with a plurality of peripheral projections and as such projections come into contact with the opposed working surface, the force and energy of rotation of the projections is capable of shearing away the opposing work piece in the form of fine particles and the material removal occurs without substantial deformation of the work piece, this being one reason accounting for the substantial advantage of the present invention over conventional grinding or similar processes. Because of the combination of high speeds and the relatively small area of the projection, the concentration of kinetic energy enables opposed material removal in the form of small particles, as opposed to the conventional chip or dust which is generated in present practice. Also, during the removal operation, there is no requirement for cooling, thus obviating the necessity for ancillary cooling equipment including oil, water or other conventionally used cooling materials. It has been further found that the machined or worked upon area is not distorted or substantially heated because of the rapidity of material removal and the complete avoidance of damage to the exposed surface of the work piece.

Because of the foregoing operation, metal removal can occur much more rapidly while preserving the integrity of the work piece, and the material removed is more easily disposed of and without requiring down time of the machine. Thus, chip treatment and removal, are entirely avoided, and the problems of disposal of coolant liquids which are frequently sources of contamination is also avoided. The small particles of material removed in accordance with my invention are easily collectible and in some instances could be reused as sintered metal materials in powder metallurgy, and can also be used in other useful by-products.

The advantages which are obtained by my invention include a wider selection of materials to manufacture the machining or cutting wheel (including the option of using materials having inherently softer properties than the worked-upon components) less physical damage is done to the work piece in the form of rupture, heating, etc.; the problem of providing ancillary cooling of the work piece during operation is entirely obviated; the form of the material removed is not in objectionable chip form, but is in the form of a fine powder; and the ability to more precisely control the finished dimensions of the work piece.

Any selection of composition of material for the cutting wheel is possible so long as the cutting wheel is rotated at a speed so that its apparent hardness is of sufficient value as compared with the worked-upon component, and the physical form of the cutting surface of the cutting wheel is in the form of a plurality of relatively small cross sectional protuberances which concentrate the entire force of the speed of the cutting wheel at the cutting surfaces of the protuberances.

OBJECTS OF THE INVENTION

The principal object of the present invention is to provide a new and improved metal working component which, by reason of operation at high speeds, can develop an apparent hardness which is not dependent upon the inherent hardness of the material and which is thereby suited for effecting such operations as material removal or the like on a component with greater inherent hardness characteristics.

A further object of the present invention is to provide a metal machining component which is operatable at high speeds in the order of 10,000 – 100,000 surface feet per minute, and having a working surface in the form of a plurality of projections of a relatively small cross sectional area which concentrate the working surface to small cross section area portions capable of effecting cutting and othe metal-working operations without the necessity of incorporating auxiliary cooling media:

Another object of the present invention is to provide a new and improved method for effecting a machining work piece in which the removed particles are in the form of a fine powder as contrasted with the conventionally generated chips and gross particles which are commonly produced in present grinding and cutting operations;

A further object of the present invention is to provide a working tool in the form of a machining wheel or the like which operates at high speeds upon a work piece and does so in such manner that the work piece is not subjected to the usual heat with deep rupturing effects which adversely affect the work piece during the course of material removal;

An overall object of the present invention is to provide a new and unique method of metal machining in which the work piece may consist of a material of substantially softer composition compared to the work piece but which is operated at such magnitudes of speed that the inherent hardness takes on physical properties of apparent hardness to a degree making it possible to effect material removal as a function of the apparent hardness;

Another object of the invention is to form the projections in a relatively soft material working component by transferring such projections from an opposing member which bears radially thereagainst;

Other objects and features of the invention will become apparent from a consideration of the following description which proceeds with reference to the accompanying drawings.

DRAWINGS

FIG. 1 is an isometric view of a rotatable working component constructed in accordance with the present invention;

FIG. 2 is an enlarged view of protuberances which are developed in the outer working surface of the rotatable component illustrated in FIG. 1;

FIG.2a is a sectional view taken in line 2a —2a of FIG. 2;

FIG. 3 is a graph illustrating the effect of speed upon the apparent hardness, working piece removal rate and kinetic wheel wear rate;

FIG. 4 is a side view of a plurality of annular bearings usable for mounting the kinetic wheel of FIG. 1;

FIG. 5 illustrates in side elevation the apparatus used for supporting the kinetic wheel during rotation thereof;

FIG. 6 illustrates the method whereby the working surface of the kinetic wheel can be renewed when the projections at the outer periphery are worn;

Figure 8:
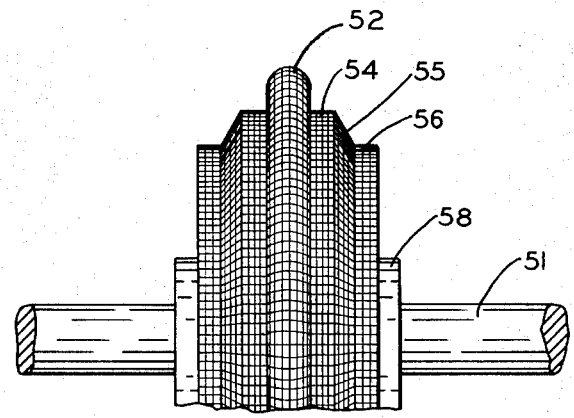

FIGS. 7a, 7b, 7c, and 7d are additional embodiments of a kinetic wheel illustrating different configurations for the projections which extend radially outwardly from the kinetic wheel and constitute the working portions of the wheel which effect material removal;

FIG. 8 is a detailed sectional view of a rotatable component constituting a further embodiment of my invention; and FIGS. 9 and 10 are enlarged sectional detail views of the working surfaces of still further working embodiments of the invention wherein angular cutting edges are utilized to remove very fine chips of stock.

DETAILED DESCRIPTION OF THE INVENTION

A kinetic wheel designated generally by reference numeral 10 (FIG. 1) is of cylindrical construction and mounted on a support shaft 12. The outer periphery 14 of wheel 10 has constructed thereon a plurality of protuberances which are knurled construction. Each knurl projection 16, referring to FIG. 2 and 2a, is a diamond shape construction and has an indentation 18 which is formed concurrently with the knurling operation and that produces the projections at the outer periphery of the kinetic wheel. Working surface 20 (FIG. 2a) of each knurled projection is for example about 0.040 inches wide at its maximum width and the maximum contact area of the projection with the opposed work piece is approximately 0.00002 square inches.

It will be seen that the working portions of the kinetic wheel consist then of a plurality of discrete working surfaces distributed substantially uniformly over the outer periphery of the kinetic wheel, each projection contributing approximately 0.00002 square inches and each rotating relatively to the work piece at an equivalent of 10,000 to 100,000 surface feet per minute at the time it engages the work piece. Concentration of the kinetic energy of the wheel is calculated in accordance with the mass of the cutting surface at its velocity at time of the cut.

The mass of the wheel is sufficient so that the kinetic energy of the kinetic wheel 10 is effective over a relatively small contact area and develops a concentration of substantial kinetic energy at a relatively small area of 0.00002 square inches. The net result is that the inherent hardness of the projection exhibits a much greater hardness termed the "apparent" hardness, which is a function of speed of rotation of the kinetic wheel.

For example, referring to FIG. 3, the apparent hardness of a material is the inherent hardness at 0 speed, and as the speed increases, the apparent hardness of the particle will increase as a function of the speed of movement of the particle. Thus, for example, should the kinetic wheel be constructed of aluminum, brass, copper or the like, the projections 16 will initially exhibit a hardness which is measured under static conditions, but once the same material is caused to rotate at unusually high speeds, the same material will exhibit a much greater hardness termed the "apparent" hardness as indicated in the graph in FIG. 3.

The general relationship is that the greater the speed, the greater the apparent hardness of a material notwithstanding its inherent hardness under static conditions. Relative hardness and abrading ability of a projection is a function of its apparent hardness and kinetic energy. When the numerous small projections 16 engage a work piece at ultra high speeds in the order of 100,000 surface feet per minute, the apparent hardness of the projections together with the kinetic energy of the rotating kinetic wheel is such that the projections whether consisting of copper, aluminum, brass, etc. are capable of removing amounts of material from a work piece of a much greater inherent hardness property. Thus, a kinetic type machining wheel constructed and operated in accordance with this invention is capable of utilizing an inherently softer material composition as compared with the work piece.

The engagement time of the projection with the opposed working piece is reduced to a microsecond duration, and therefore the amount of material removed at any one moment from the work piece is relatively small. As a result there is less heat generated in the process of removing material from the work piece per unit of time, thus generating less heat and less distortion of the machined area than is the case with conventional tools. The aggregate of the particles removed per unit of time is substantial, owing to the individual impact time for each projection impact being so small. Also, there is insufficient time for heat transfer into the work piece.

The wear rate of the kinetic wheel is substantially reduced as indicated in FIG. 3, thus contributing to the useful life of the kinetic wheel than compared to the conventional tools which routinely are dulled and must be re-dressed and re-sharpened. It has been found that in contrast with the present invention, the conventional method of material removal at slower rates proceeds by a mechanism of rupturing material and removing it in the form of large chips or grit. In contrast with this mechanism, the present invention removes the opposing material in the form of small powder particles that is not accompanied either by the generation of high temperatures or rupturing the opposed material to cause the distortion of the work piece. Since the work piece is neither mechanically nor thermally distorted, it is possible to produce a much more precise machining operation upon the work piece and also to obtain a complete machining operation without requirement of auxiliary coolant such as commonly used in the form of oil, water, etc. The use and disposal of these auxiliary coolants is the source of added cost, contamination, and disposal and such auxiliary cooling functions are rendered unnecessary by means of the present invention.

The by-product of the machining operation consisting of small-particle powder residue, is a valuable by-product and can be readily used in such applications as powder metallurgy. The powder which is generated can be easily stored and does not have to be purged of coolant as is the case in chip or gross particle size materials which are produced under conventional grinding operations. The powder material by-product is easily collected by vacuum removal.

In operation, owing to the ultra high rotational speeds, the shaft 12 is mounted upon a plurality of concentric races 22–28, with adjacent races separated by a plurality of bearing elements 30. Thus, the ultra high speed which is produced at the shaft 12, is stepped down by increments of differential speed between the innermost and outermost races 22–28 so that no one race is operated at excessive speed. The outermost race 28 is held within a stationary journal 32. In order to give rigidity to the kinetic wheel, the shaft 12 is held at two spaced points on stanchions 34, 36 respectively, and a drive member 38 with a drive belt or gear 40 therebetween effects input driving force required to rotate the shaft 12 and hence the wheel 10 at the appropriate speed.

When the knurled protuberances 20 are worn, the wheel is either removed or displaced from its working position indicated in FIG. 5 as illustrated in FIG. 6, the wheel is displaced from the dotted to the full line position and a projectile forming tool 44 having wheels 46, 48 is pressed against the outer periphery 14 of the kinetic wheel 10 to effect a new pattern of projectiles in the outer periphery. Because of the relatively soft nature of the cutting wheel at static speed, it is quite easy to cut or form renewed projections 16 within the outer periphery 14 of the wheel 10, thus restoring the original size of the formed projections which have become either removed or worn down to base level 50 (FIG. 2a).

The present invention is not limited to forming projections. Any acceptable method of obtaining projections on the surface of the kinetic wheel which is appropriate for the composition of wheel is contemplated by the invention. For example, the projections may be formed into or transferred upon the working surface of the kinetic wheel. Other configurations are equally useful and are within the scope of the present invention. Essentially, what is required is a relatively small cross sectional area of the kinetic wheel to come into contact with the opposed surface to be worked upon. Referring to FIG. 7a, 7b, 7c and 7d, the projections 16 can be in the form of, as in the case of 7a, a plurality of rhombic cross section projection 16a which are formed on the kinetic wheel 10 and mounted on shaft 12, or the projections can be pyramidal shaped as indicated by reference numeral 16b in FIG. 7b.

Figure 7A:
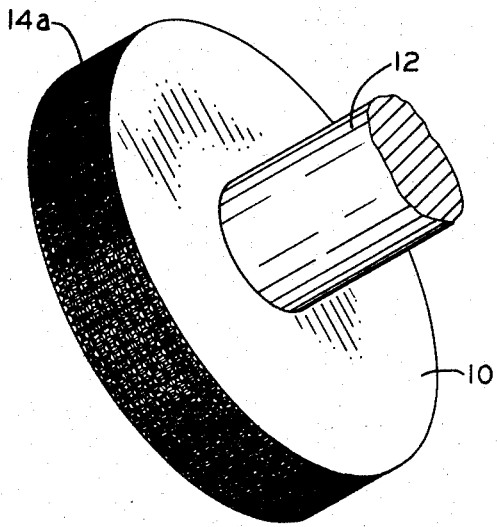
Figure 7B:
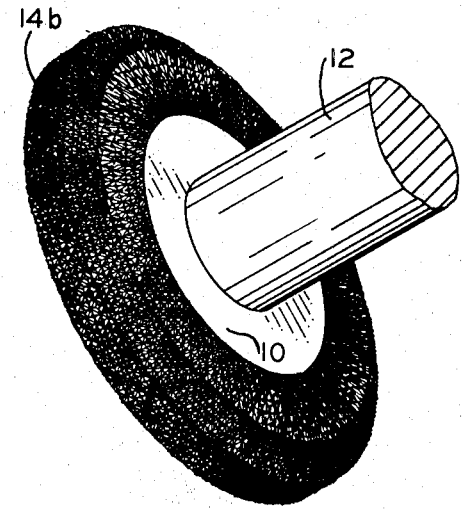
Figure 7C:
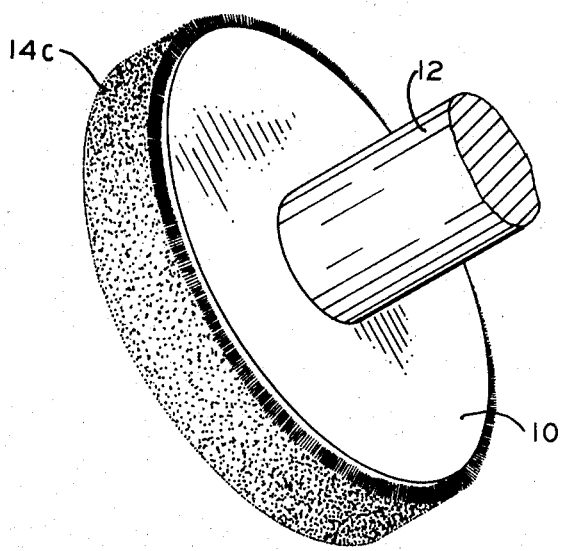
Figure 7D:
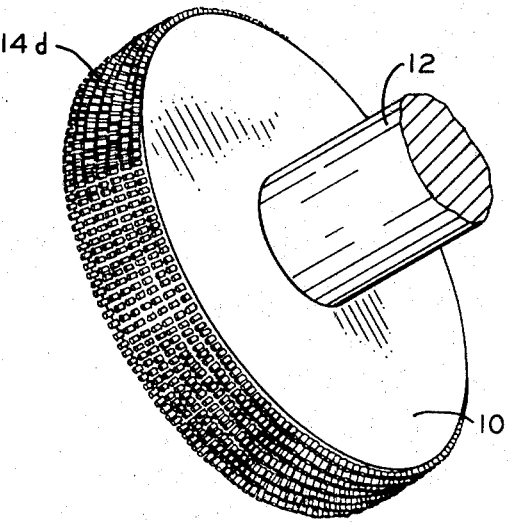

Referring to FIG. 7c, the projections can be in the form of a number of radially extending wires 16c, or, in the case of embodiment FIG. 7d, the projections may be in the form of a plurality of regularly spaced hobs 16d. Also melted metal flowing from small holes in working surface of machining wheel may be used to produce the projections.

In each case, the principle is the same; namely, to concentrate the impact area across a relatively small cross sectional dimension in order that the effect of impact is distributed over a small area whereby the particle removal mechanism will occur within a relatively short time and at low temperatures, and produce a small size particle removal from the opposed surface of the work piece.

It is further required that the projections be of relatively small area so that the apparent hardness effects of the ultra high speed movement of the projections will be manifested even though the work piece is of harder inherent composition than the kinetic wheel projections. The particles removed are of micron size and the projections will effect the removal without generating high temperatures or producing rupture in the work piece proper.

Referring to the embodiment of FIG. 8, Sections 52, 54, 55, 56 and 58, an useable kinetic wheel, wherein different diameter sections provide functional surfaces for effecting material removal in the aforedescribed manner.

Figure 9A:
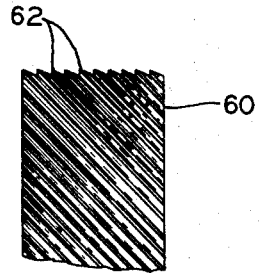
Figure 9B:
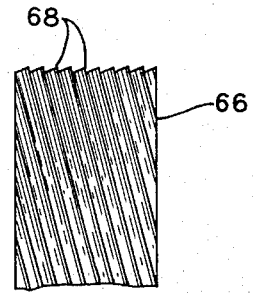

FIGS. 9a and 9b contain sloping or angular cutting edges sloping to the left as indicated by the edges 60, 62 in FIG. 9a, or to the right as indicated by reference numerals 66, 68 in FIG. 9b. These angular cutting edges are ideal for removing fine hairlike chips as stock removal is effected.

OPERATION

In operation, the kinetic wheel 10 which is mounted on power shaft 12 is brought up to ultra high speeds by means of the belt connection 40 through pulley 38 connected to the shaft 12. The shaft 12 is supported at spaced apart points by stanchions 34, 36 to prevent bending of shaft 12 and thereby holding the operative position of the kinetic wheel 14 within close tolerances. Because of the plurality of concentric bearings, relative speed between adjacent races 22–28 is reduced so that the speed is successively reduced from the innermost race to the outermost race, thus relieving frictional effects on any one set of bearings. Once the kinetic wheel 10 is brought up to speed so that the outer periphery 14 is moving at a speed range of between about 10,000 to about 100,000 surface feet per minute, the hardness qualities of the material will change, the general relationship being that the inherent hardness of the kinetic wheel material under static conditions is greatly increased to a new value, namely, an "apparrent" hardness, in accordance with the relationship indicated in FIG. 3.

The apparent hardness of the kinetic wheel material can reach a value such that in spite of its inherent hardness, it is useful for grinding or working upon materials having a higher inherent hardness. Thus such relatively soft materials as aluminum, copper and alloys such as brass, steel, etc, can be brought up to speeds where the apparent hardness of the material is so increased that it is useful for working up materials having a higher inherent hardness.

As the periphery of the kinetic wheel is brought into contact with an opposing surface, the protuberances or projections 16 are brought into engagement with the opposing surface, and, because of their high kinetic energy and microsecond period of engagement, are capable of removing material albeit such work piece material is of relative greater inherent hardness. The material which is removed from the work piece is of very fine particle size in the order of micron size and such generated material can be readily collected by means of a vacuum line or the like (not shown). The mechanism of material removal appears to be substantially different from conventional grinding operations which take place at substantially lower speeds in the order of 3,600 to 9,000 surface feet per minute, in that high temperatures are not generated owing to the small time duration of engagement by any one protuberance 16 with its opposing surface. Also, the mechanics of material removal appears to be different in that the impact has a pulverizing effect rather than a chip removal effect, and consequently there is no requirement for auxiliary cooling from such media as oil, water or the like. Because of the elimination of any requirement for coolant, there is an obvious economy in operation because the residue material is easier to handle, the coolant does not have to be used which in itself is a substantial saving, and there is no problem of disposal of the coolant.

It has further been found that the rate of wear of the kinetic wheel substantially decreases in accordance with the relationship indicated in FIG. 3, this probably owing to the fact that lower temperatures are encountered in operation and also the mechanism of material removal from the work piece is also changed from the conventional removal mechanics. That is to say, in contrast with conventional removal of material from the work piece, there is no fracturing or thermal distortion of the work piece and thus more precise forming of the work piece can take place.

A further important feature of the present invention is that it is now possible to use more readily available materials of construction for the kinetic wheel which can be selected not merely on the basis of inherent hardness but on such other bases as well, including material availability. Formability, etc. and such materials by reason of their high speed can be caused to assume a new hardness, namely, an apparent hardness which is a function of speed. So long as the apparent hardness of the kinetic wheel is in excess of the inherent hardness of the work piece, material removal will be effected of the static work piece. It is an important feature of the present invention that the actual working surfaces of the kinetic wheel be in the form of multiplicity of relatively small cross sectional protuberances in order that the concentrated energy of the wheel is developed for a short period of time at distinct time intervals in order to reduce temperature and realize maximum effect of the "apparent" hardness of the material.

It is relatively easy to reform the protuberances, as for example the manner indicated in FIG. 6 in which the grinding wheel is slowed or stopped and then brought into contact with knurling wheel 46, 48 which will reshape additional protuberances on the outer periphery of the grinding wheel.

Knurling is not the only configuration which can be utilized since rectangular cross sectional protuberances can also be developed as indicated in FIGS. 7a–7d. In each of these alternate constructions, the same criteria is applied, namely, discrete and individual projections, come into contact with the work piece for only a minimal period of time and each effects individually its material removal function in accordance with the apparent hardness as distinguished from the inherent hardness of the material.

It should be understood that other configurations are suitable, these disclosed being only illustrative and by no means limitative of the invention. It is possible to configure whatever convenient cross sectional projection is desired in accordance with the specific application and be well within the teaching of the present invention.

It should be understood that a kinetic wheel of greater inherent hardness characteristics may be employed and rotational speeds correspondingly decreased since the apparent hardness factor contributed by extraordinary high speed is not required to the same extent. Two considerations should be balanced:

a. the inherent hardness of the material of construction of the kinetic wheel, and
b. The rotational speed of the kinetic wheel.

Both may be adjusted and balanced for a particular hardness requirement to perform a material removal required against each other in a given application.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. In a process for metal removal using rotatable metal removal members, the steps including:
   a. providing a rotatable member with at least an annular section of material defining an annular working surface thereon concentric with the rotational axis of said member;
   b. forming a plurality of projections which are distributed over the working surface of said annular section to form discrete surface regions adapted to contact and remove material from an opposing surface against which the annular surface of the member is caused to bear; and
   c. rotating the member at such high rotational speeds that the apparent hardness of the material of said member is substantially increased so as to exceed the inherent hardness of the metal removal working surface, said metal removal working surface material being a soft, malleable composition material.

2. The process according to claim 1 which includes: reforming the said annular surface of said member to restore the said projections thereon when the projections become worn.

3. The process according to claim 1 wherein the rotational speed of said member in such that the said annular surface thereof moves at a speed in the order of 10,000 – 100,000 surface feet per minute.

4. The process according to claim 1 which includes the step of forming said member of concentric relatively rotatable portions journaled on each other and which are made to increase in relative speed by increments relative to each other in the direction toward said annular surface.

5. The process according to claim 4 in which the said portion of said member in the outermost position has said annular surface thereon and moves at the highest rotational speed.

6. The process according to claim 1 which includes the step of forming said projection on said annular surface by pressing.

7. The process according to claim 1 in which the linear speed of said annular surface is on the order of about 100,000 feet per minute.

* * * * *